July 31, 1951 J. M. EGLY 2,562,778
RETRACTABLE LANDING GEAR
Filed Nov. 27, 1946 3 Sheets-Sheet 1

John M. Egly
INVENTOR.

HIS PATENT ATTORNEY

July 31, 1951  J. M. EGLY  2,562,778
RETRACTABLE LANDING GEAR
Filed Nov. 27, 1946  3 Sheets-Sheet 2

John M. Egly
INVENTOR.

BY

HIS PATENT ATTORNEY

July 31, 1951 J. M. EGLY 2,562,778
RETRACTABLE LANDING GEAR
Filed Nov. 27, 1946 3 Sheets-Sheet 3

John M. Egly
INVENTOR.

BY

HIS PATENT ATTORNEY

Patented July 31, 1951

2,562,778

UNITED STATES PATENT OFFICE 2,562,778

RETRACTABLE LANDING GEAR

John M. Egly, Buffalo, N. Y., assignor to Curtiss-Wright Corporation, a corporation of Delaware Application November 27, 1946, Serial No. 712,651

5 Claims. (Cl. 244—102)

This invention relates to landing gears and more particularly to new and improved arrangements of the components and locking devices of retractable landing gears for aircraft and other vehicles.

It has long been a problem in the design of retractable landing gears for aircraft to provide a simple and dependable means for locking the gear in its extended and retracted positions. Numerous locking devices have heretofore been proposed and used, but for the most part these prior devices have been complicated and of costly construction, and have given rise to numerous difficulties in the operation of the aircraft to which they were fitted. Attempts have also been made to provide automatic latches having slotted levers and spring opposed compressible links, but none of these expedients have proven positive in action or to be otherwise satisfactory.

The improved arrangement of the landing gear components and its locking mechanism as embodied in the present invention obviates the complication, added weight and constant source of production and service difficulties presented by these prior retractable landing gears and their locking mechanisms. The landing gear of the present invention is pivotally mounted for lateral swinging about a fore and aft axis and its retracting mechanism is so arranged as to make the landing gear automatically self-locking in both the up and down positions. The landing gear mechanism includes a breaking strut having a locking joint with which is associated spring means serving to hold the gear in locked position, the retracting motor being operable to both break the strut and to swing the landing gear between its retracted and extended positions.

It is accordingly a major object of this invention to provide an improved retractable landing gear having a novel arrangement of its component parts such that it is adapted for automatic self-latching in both its up and down positions. It is a corollary object of this invention to provide such a retractable landing gear in which the complicated and troublesome up and down latches of the prior art are eliminated. It is a further object of this invention to provide a retractable landing gear which incorporates in its retracting linkage simple and foolproof means for securely locking the landing gear in both of its extreme positions. Other objects and advantages of the present invention will occur to those skilled in the art after reading the following description, taken together with the accompanying drawings, in which:

Figure 1:
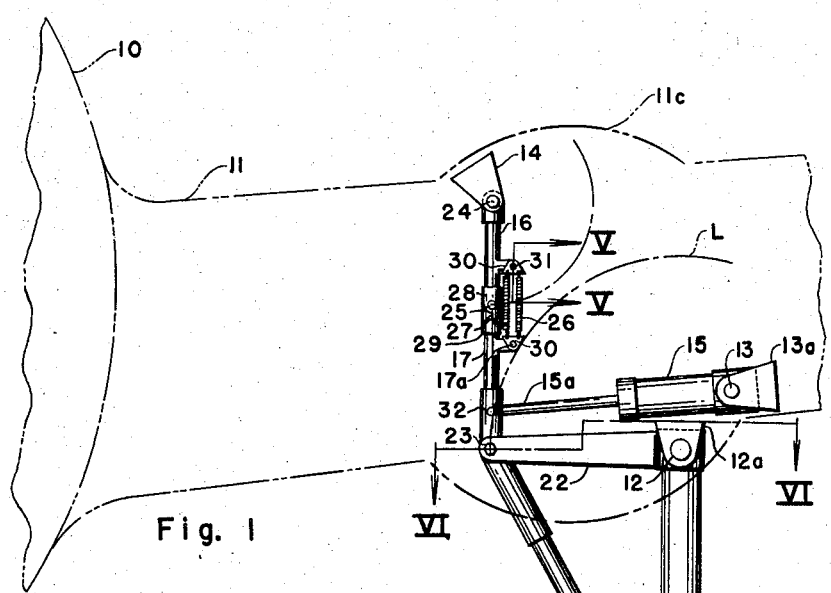
Fig. 1 is a front view of the improved landing gear and locking arrangement as pivotally attached to an airplane wing.
Figure 5:
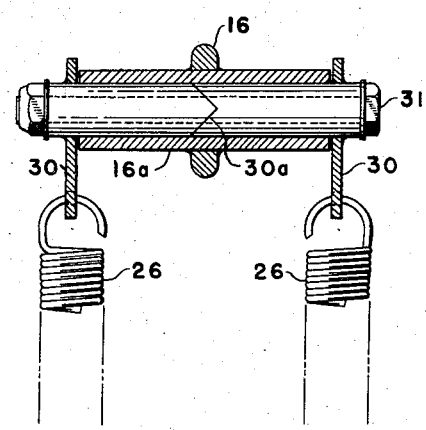
Fig. 5 is a sectional view taken through a typical locking spring support as viewed along the lines V—V of Fig. 1.

Referring now to the elevational views in Figs. 1 to 4 inclusive, the numeral 10 designates the body or fuselage of an airplane from which there is laterally extended a wing 11. The wing may preferably be provided with a forwardly disposed main spar 11a and a rearwardly disposed spar 11b. At a point laterally disposed from the fuselage 10 the wing 11 may preferably support an engine faired within a cowl or nacelle 11c. The improved landing gear of the present invention is preferably supported from the wing structure in the region of the cowl 11c into which it may be retracted and stowed out of the airstream during flight. It will of course be understood that the present retractable landing gear, as well as its improved locking means, is equally adapted for retraction within the fuselage or any other component part of the airplane or other vehicle which it is adapted to support.

The main point of attachment of the landing gear to the wing structure comprises the pivot shaft 12 journaled within the terminal fittings 12a and 12b which are attached respectively to the lower chord members of the spars 11a and 11b. Supplemental structural attachment points are provided by the pivot fittings 13a and 14 which are rigidly supported from the wing structure for the pivotal attachment of the actuating cylinder 15 at pivot 13, and the breaking locking links 16—17, respectively.

The main landing strut 18 is of the conventional telescopic shock-absorbing type having a piston portion 18a axially reciprocable therewithin and to which is rotatably attached the wheel, or other ground-engaging member 19. The main shock-absorbing strut 18 is laterally braced by the side brace or strut 20, and is braced in the fore and aft direction by the drag strut or brace 21. The lower end of the main strut 18 is provided with a terminal fitting having a pin connection 18b to which the side brace strut 20 is rigidly attached, and also has a further attachment bolt 18c to which the drag strut 21 is rigidly attached. This triangular framework, of which the main strut 18 forms the common corner member, is completed by the cross support member 22. As may be seen in Fig. 6, this support member 22 provides at one of its terminals a connection to the upper terminal of the main strut 18 and an apertured portion adapted to be journaled upon the main support pivot 12. The opposite terminal of the member 22 is bifurcated as shown in Fig. 6 to receive the hollow pivot pin connection 23 at which the transverse triangular frame is completed by the side brace strut 20.

The locking links 16 and 17 are pivotally attached at their outer terminals to the pivot points 24 and 23 respectively, and are pivotally connected to each other at the intermediate pivot 25. The upper link 16 and the lower link 17 are positioned such that when their centerline coincides with the straight line between the axes of the pivots 23 and 24, their centerline is substantially tangent to the loci L of point 23 about the axis of the pivot 12. This particular relationship of the normally aligned breaking strut 16—17 has been found to minimize the loads these members are required to carry. The coincidence of the centerline and a straight line between points 23 and 24 is maintained, except of course during retraction or extension, by a tension spring assembly 26 exerting pressure on the lip 27, which is incorporated in the upper link center fitting 28, and which butts against the lower link center fitting 29. This action prevents premature folding of the links 16 and 17 when external loads are applied. In the spring assembly 26 a special mounting arrangement is used to provide an even force distribution as in the case of the failure of one of the springs of the double pair forming the combination. Each of the four springs 26 is attached at its terminals to the ears of hollow trunnions 30 which are V notched as at 30a to mate with each other. The trunnions, which are freely rotatable within the sleeves 16a and 17a, are connected together by the through bolts 31 which serve to keep the keys 30a in contact, and this engagement accordingly causes the trunnion halves to rotate freely together within its journal in the fitting 28.

The retracting jack 15 is shown in the drawings as of the hydraulic-actuated type although it will be understood that equally good results will be obtained from electric motor driven lead screws or any of the other known types of extensible strut acting mechanisms. The lower and outer terminal of the actuating cylinder 15 is pivotally mounted upon the support fitting 13 and the piston portion 15a is pivotally connected at its upper terminal to the lower fitting of the lower locking link 17 at the pivotal connection 32 within the bifurcated pivot fitting 32a. The axis of the latter is located at such a point as has been found most efficient for the particular arrangement and combination of the link and supports which are used, but it should also be maintained as close as possible to the point 23 without causing interference with any of the adjacent moving parts.

Figure 3:
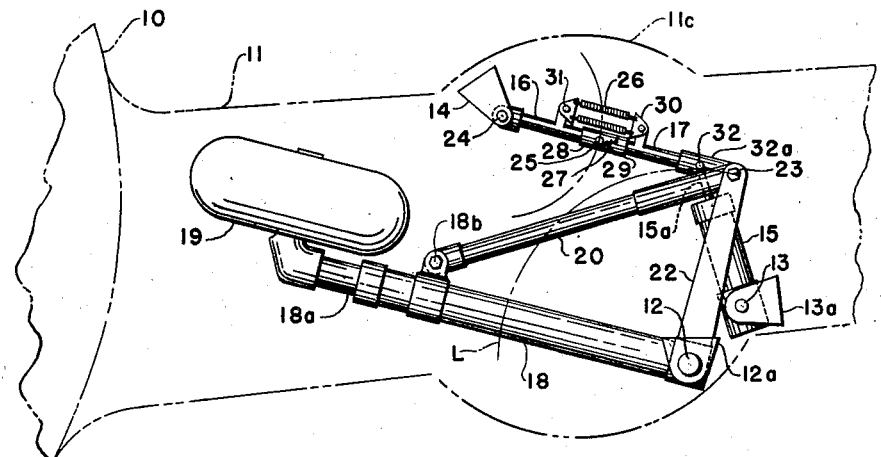
Fig. 3 is a similar view of the same fully retracted and locked in its up position.
Figure 2:
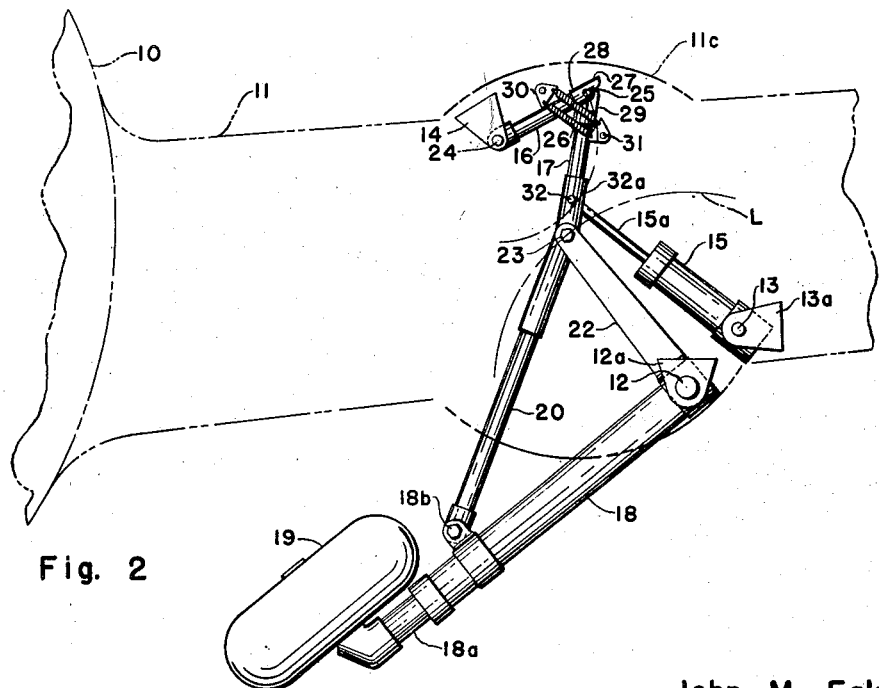
Fig. 2 is a similar view of the same landing gear in a partially retracted position.
Figure 4:
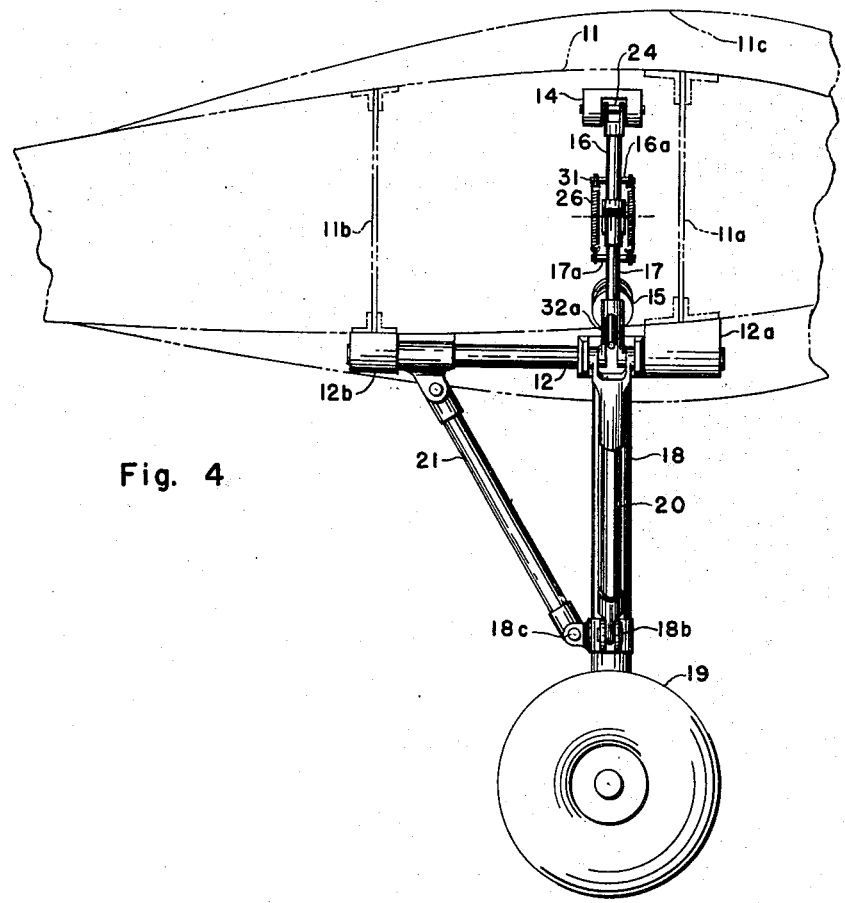
Fig. 4 is a side view of the same landing gear in its fully extended position.
Figure 6:
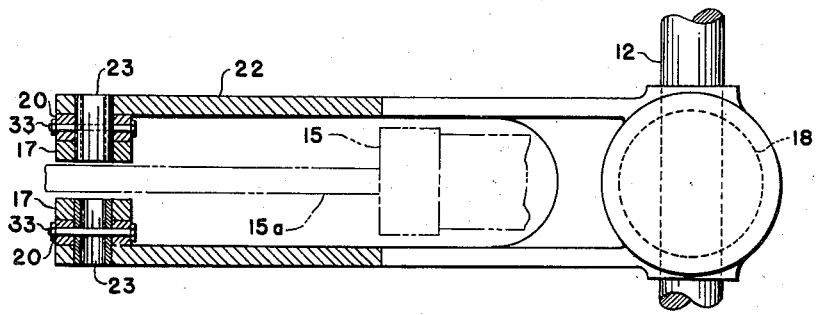
Fig. 6 is a part sectional plan view of a cross support component of the landing gear as taken along the lines VI—VI of Fig. 1.

As will be noted in Figs. 2 and 3, the piston 15a of actuating cylinder 15 during the retraction cycle must pass across the axis of the pivot 23 and accordingly the cross support 22 is formed with a bifurcated or yoke portion as referred to above, and as more clearly shown in Fig. 6.

Similarly the pivotally attached terminal of the brace 20 and the lower fitting of the link 17, are also formed to permit their pivotal rotation about the axis of the pin 23 without interference with the adjacent elements. This pivotal connection 23 is formed by the insertion of bushings or hollow pins 23 through the adjacent bifurcated portions of the link 17, the brace strut 20 and the bifurcated end portion of the cross strut 22, the respective parts being retained about the bushings 23 by means of the transverse through bolts 33, as shown in Fig. 6.

It will accordingly be seen that the retracting mechanism of the present landing gear arrangement is so arranged as to make the gear automatically self-locking in both the up and down positions. The landing gear has been illustrated as pivotally mounted for lateral inward swinging about a fore and aft axis passing through the centerline of the main strut, and also as incorporating a triangular framework offset inwardly from this main strut. Obviously the invention is not limited to laterally swinging landing gears with the offset which has been shown, but is equally adapted for use with fore and aft retracting gear frames, and under certain applications and designs might be required to be offset outwardly.

It will also be noted that the apex of the triangular landing gear framework is connected to a normally aligned breaking strut member which is so arranged as to resist by direct compression of its parts any swinging of the landing gear under externally applied forces when the gear is in either the up or down position. This breaking strut has a locking joint which with the associated spring assembly tends to hold the joint in its securely locked condition, and the lower element of the breaking strut is pivotally connected to the piston of the actuating motor which is preferably connected close to the pivotal connection at the offset of the triangular framework. This hydraulic, or other actuating, motor is operable to both break the locking strut and to swing the gear between its two terminal positions; the actuating motor being pivotally connected to the aircraft structure in the general region of the swinging axis of the landing gear framework.

The sequence of operation of the retractable landing components and the locking mechanism is as follows:

Starting from the extended position of the landing gear as shown in Fig. 1, contraction of the actuating jack or motor 15 initiates breaking of the strut link 16—17 about its pivot 25, by causing the lower link 17 to rotate in a clockwise direction about the pivot 23 and the upper link 16 to rotate in the opposite direction about the pivot 24. The tension in the spring 26, however, has tended to maintain the breaking strut 16—17 in its aligned position about the central pivot 25 and the force exerted by the actuating cylinder 15 at the pivot connection 32 is in turn sufficient to cause the triangular landing gear framework to begin to rotate inwardly and upwardly about the axis of its main pivotal support at 12. The pivot 23 then proceeds to follow the loci or path L with pivot 12 as its center and the breaking strut 16—17 gradually assumes the relationship shown in Fig. 2, wherein the force of the springs 26 is now exerted on the opposite side of the pivot 25, in which position the springs 26 now tend to increase the folding movement of the strut parts about their common pivot.

As the contracting movement of the actuating cylinder 15 continues, the point 23 is caused to move past the line connecting point 12 with point 24; after this relationship occurs, and the pivot 32 moves beyond the line joining points 23 and 24, the links 16 and 17 are caused to straighten out again due to continued pull by the piston rod 15a. The springs 26 now force the lip 27 back into place, holding the links again in a straight line whereby they retain and lock the landing gear in its full up position as shown in Fig. 3. In order to extend the gear it is merely necessary to reverse the above procedure. In either the retracted position, or the fully extended position, shown in Fig. 1, the requirement of any additional latching means for these extreme positions of the landing gear is accordingly eliminated and fully replaced by the automatically latching links 16—17 and their associated mechanism.

Other forms and modifications of the present invention, both in respect to its general arrangement and the details of its respective parts, which may occur to those skilled in the art after reading the present description, are intended to come within the scope and spirit of this invention as more particularly defined in the appended claims.

I claim:

1. In aircraft, a retractible landing gear including a main landing strut pivotally mounted at a fixed point upon the aircraft at the upper terminal of said main strut, said main strut having a ground-engaging element operably carried adjacent its lower terminal, an offset movable pivotal connection carried by said main strut laterally spaced in its operative position from the said upper pivotal mounting of said strut, an intermediately hinged breaking strut pivotally connected to the aircraft and to said offset movable pivotal connection, the axis of said breaking strut portions being aligned in the extended operable position of the landing gear and disposed parallel to but offset from the axis of said main strut and substantially tangent to the path of movement of said movable offset pivot to effectively restrain rotation of said main strut about its fixed pivotal mounting upon the aircraft, power means connected to one of said breaking strut portions and to a pivot upon the aircraft arranged to break said breaking strut and rotate said main landing strut about its fixed pivotal mounting into a fully retracted position in which said breaking strut portions are again aligned, are parallel to but offset from the axis of said main strut and effectively oppose the rotation of said main landing strut toward its extended operative position by the application of its restraining force at said pivotal connection spaced from said fixed strut pivot.

2. In a retractable aircraft landing gear including a main landing strut pivotally mounted upon the aircraft at its upper terminal, said main strut having a ground-engaging element operably carried adjacent its lower terminal and a pivotal connection carried by said main strut laterally spaced in the operative position of the landing gear from the said upper pivotal mounting of said strut, automatically locking retracting mechanism including an intermediately hinged breaking strut having one portion pivotally connected to the aircraft and another portion pivoted to said laterally spaced pivotal connection, said breaking strut portions having a main axis interconnecting its said pivotal terminals in the aligned positions of said strut portions, power means pivotally connected to one of said breaking strut portions arranged to break said breaking strut and to rotate said main landing strut about its fixed pivotal mounting into its extended and retracted positions by the application of said power at said laterally spaced pivotal connection, the said fixed and movable pivots of said landing gear strut, said breaking strut and said power means arranged in such manner that the said axis of said breaking strut portions is parallel to but offset from the axis of said main landing strut for effectively restraining rotation of said strut about its said fixed pivotal mounting in both its extended and retracted positions.

3. In aircraft, an aircraft structure, a wheel-carrying frame pivotally supported at a fixed pivot upon said aircraft structure, said frame including a substantially vertically disposed main strut carrying said fixed pivot on its vertical axis at its upper terminal in its extended operative position, said frame having a movable offset pivotal connection laterally displaced from said main strut pivotal support upon said aircraft structure, a pair of normally aligned links pivotally interconnected with each other and pivotally interconnecting said fixed aircraft structure with said movable offset pivotal connection of said frame, said links being vertically disposed substantially parallel to said main strut axis and tangent to the arcuate path of movement of said movable offset pivotal connection when said main strut is in its extended operative position, resilient means attached to each said link arranged to urge them into an aligned position, and actuating means pivotally connected to a fixed pivot upon said aircraft structure and to one of said normally aligned links arranged upon the application of a contracting force thereto to break the alignment of said normally aligned links toward said actuating means for the retraction of said wheel-carrying frame and strut, said actuating means being horizontally disposed in the extended operative position of said main strut, said links arranged to become aligned under the influence of said resilient means in both said extended and retracted positions for the locking of said wheel-carrying frame and strut to said aircraft structure in each of said positions by directly restraining movement of said movable offset pivotal connection whereby rotation of the wheel-carrying frame about said fixed pivot is prevented.

4. In aircraft, an aircraft structure, a wheel-carrying frame pivotally supported at a fixed pivot upon said aircraft structure, said frame main strut carrying said fixed pivot on its vertical axis at its upper terminal in its extended operative position, said frame having a movable offset pivotal connection laterally displaced from said main strut pivotal support upon said aircraft structure, a pair of normally aligned links pivotally interconnected and pivotally interconnecting a pivot fixed upon said aircraft structure with said movable offset pivotal connection of said frame, said links being disposed substantially parallel to said main strut axis and tangent to the arcuate path of movement of said movable offset pivotal connection when said main strut is in either extreme position, actuating means pivotally connected to a pivot fixed upon said aircraft structure and to one of said normally aligned links arranged upon the application of forces thereto to break the alignment of said links for the extension and retraction of said wheel-carrying frame, said actuating means being horizontally disposed in the extended operative position of said main strut, and resilient means associated with said pair of pivotally interconnected links adapted to resiliently return and maintain said links into their aligned positions for the automatic locking of said wheel-carrying frame in both its extended and retracted positions by directly restraining movement of said offset pivotal connection whereby rotation about said fixed pivotal support is prevented.

5. In aircraft, an aircraft structure, a landing gear strut pivotally mounted at a fixed pivot upon said aircraft structure at the upper terminal of said strut in its extended operative position, ground-engaging means operatively carried adjacent a lower terminal of said strut, a frame fixedly carried by said strut, said frame having a movable pivotal connection offset from but parallel to said pivotal support of said strut on the aircraft structure, a pair of normally aligned folding links pivotally connected to said aircraft structure and to said movable offset pivotal connection of said landing gear frame, said links being pivotally interconnected and having abutting portions adapted in their aligned position to withstand compression, resilient means interconnecting said folding links tending to maintain the same in their aligned positions, and actuating means pivotally connected to one of said pivoted links and to a pivot fixed upon said aircraft structure arranged for the extension and retraction of said landing gear strut and frame, said pivoted links being resiliently foldable during retractive and extended movements but rigidly aligned to lock said landing gear strut and frame in each of its extreme positions, said actuating means being horizontally disposed in the extended operative position of said strut, the axis of said pivotal links in each of their aligned positions being substantially parallel to but offset from the axis of said landing gear strut and tangent to the arcuate path of movement of said movable offset pivot arranged to effectively prevent rotation of said landing gear strut about its fixed pivot by restraint applied at the said offset pivotal connection of said frame.

JOHN M. EGLY.

REFERENCES CITED

The following references are of record in the file of this patent:

UNITED STATES PATENTS

| Number | Name | Date |
|---|---|---|
| 2,360,759 | Chalberg | Oct. 17, 1944 |
| 2,385,063 | Dreifke | Sept. 18, 1945 |
| 2,405,651 | Height | Aug. 13, 1946 |
| 2,438,650 | Saulnier | Mar. 30, 1948 |